United States Patent
Miyajima et al.

(10) Patent No.: US 7,909,596 B2
(45) Date of Patent: Mar. 22, 2011

(54) RESIN MOLDING MACHINE AND METHOD OF RESIN MOLDING

(75) Inventors: Fumio Miyajima, Chikuma (JP); Yoshio Watanabe, Chikuma (JP); Tetsuya Nishizawa, Chikuma (JP); Hiroaki Yamagishi, Chikuma (JP); Mitsugi Yoshino, Chikuma (JP); Takashi Katayama, Chikuma (JP)

(73) Assignee: Apic Yamada Corporation, Chikuma-Shi, Nagano (JP)

( * ) Notice: Subject to any disclaimer, the term of this patent is extended or adjusted under 35 U.S.C. 154(b) by 605 days.

(21) Appl. No.: 11/984,609

(22) Filed: Nov. 20, 2007

(65) Prior Publication Data

US 2008/0116598 A1     May 22, 2008

(30) Foreign Application Priority Data

Nov. 22, 2006    (JP) ................................. 2006-316075
Oct. 27, 2007    (JP) ................................. 2007-279723

(51) Int. Cl.
*B28B 17/00* (2006.01)
*B08B 3/00* (2006.01)

(52) U.S. Cl. ............................. 425/229; 425/225; 134/1

(58) Field of Classification Search ............... 425/225, 425/229, 230; 134/1, 198; 250/494.1
See application file for complete search history.

(56) References Cited

U.S. PATENT DOCUMENTS

| 3,941,537 | A | * | 3/1976 | Abraham | 425/228 |
| 5,373,140 | A | * | 12/1994 | Nagy et al. | 219/121.68 |
| 5,783,220 | A | * | 7/1998 | Osada et al. | 425/116 |
| 6,113,707 | A | * | 9/2000 | Benea et al. | 134/1 |
| 6,140,659 | A | * | 10/2000 | Shizuka | 250/504 R |
| 6,369,353 | B1 | * | 4/2002 | Soska | 219/121.68 |

FOREIGN PATENT DOCUMENTS

| JP | 2000-334746 | | * 12/2000 |
| JP | 2001-314558 | A2 | 11/2001 |
| JP | 2003-145548 | A | 5/2003 |
| KR | 1019990074698 | A | 10/1999 |
| WO | WO 99/422228 | A1 | 8/1999 |
| WO | WO 99/65061 | A2 | 12/1999 |

* cited by examiner

*Primary Examiner* — Maria Veronica D Ewald
(74) *Attorney, Agent, or Firm* — Birch, Stewart, Kolasch & Birch, LLP

(57) ABSTRACT

The resin molding machine is capable of cleaning a resin molding die while performing a molding action without stopping the molding action and capable of securely removing contaminations from the resin molding die. The resin molding machine comprises: a press unit including a resin molding die; and a cleaning unit for cleaning a molding face of the resin molding die. The cleaning unit has an energy ray irradiation section, which irradiates an energy ray to the molding face of the resin molding die so as to easily peel off a contamination, which has been stuck on the molding face during a molding action, from the molding face. The contamination is stuck onto resin of a molded product when the product is resin-molded, so that the molded product is released from the resin molding die together with the contamination.

7 Claims, 5 Drawing Sheets

RESIN MOLDING MACHINE AND METHOD OF RESIN MOLDING

BACKGROUND OF THE INVENTION

The present invention relates to a resin molding machine and a method of resin molding, in each of which a molded product can be easily released from a resin molding die even if resin which can firmly stick to the resin molding die is used, contaminating the die can be prevented and a cleaning action can be easily performed.

These days, green resin, which does not badly influence the environment, has been used in resin molding machines. The green resin includes an organic phosphorous fire retardant, a hydrated fire retardant or no fire retardant. In comparison with conventional resin, the green resin can firmly stick to a molding face of a resin molding die. Therefore, it is difficult to release a product, which has been molded with the green resin, from the resin molding die. Further, the resin molding die is easily contaminated.

Conventionally, a release agent is mixed with resin so as to easily release a molded product from a resin molding die. For example, in case of producing automobile parts which must have high reliability, no release agent is included in resin for molding, so resin-molded parts cannot be easily released from the resin molding die and the resin molding die is easily contaminated.

In case of using transparent resin for encapsulating an LED, optical characteristics of the resin are important, so no release agent is included. Therefore, resin-molded products, e.g., LED, cannot be easily released from a resin molding die.

To easily release resin-molded products from a resin molding die, cavity faces of a resin molding die are mirror-finished or a release agent is applied to a molding face of a resin molding die.

To remove contaminations from a molding face of a resin molding die, the molding face is brushed every time a molding action is performed or an energy ray, e.g., ultraviolet ray, laser beam, is irradiated to the molding face for ashing and removing contaminations. Note that, a method of removing contaminations from a molding face by irradiating an excimer laser is disclosed in Japanese Patent Gazette No. 2003-145548.

Sticking contaminations onto a molding face is caused by resin and a structure of the molding face. For example, even if the molding face including cavities is formed by electric discharge machining and polished like a mirror face, micro holes and micro projections are complexly formed in the molding face. Therefore, resin fills the micro holes and the micro projections during the molding action. When the molding face is cleaned, the resin filling the micro holes and the micro projections must be removed.

The method of removing contaminations by irradiating an energy ray, e.g., ultraviolet ray, laser beam, is effective to clean the molding face. However, the molding face must be cleaned by the energy ray every time several hundred molding actions are performed, so a manufacturing line must be stopped for the cleaning action. Further, the cleaning action is troublesome. In case of cleaning the molding face by irradiating the excimer laser, the manufacturing line need not be stopped, but contaminations are decompounded and removed by an ozone gas, which is formed by irradiating the excimer laser. Namely, contaminations cannot be securely removed, and a harmful gas is formed.

SUMMARY OF THE INVENTION

The present invention was conceived to solve the above described problems.

An object of the present invention is to provide a resin molding machine and a method of resin molding, each of which is capable of cleaning a resin molding die while performing a molding action without stopping the molding action and capable of securely removing contaminations from the resin molding die even if highly adhesive resin, e.g., green resin, which firmly sticks to the resin molding die, is used.

To achieve the object, the present invention has following structures.

Namely, the resin molding machine of the present invention comprises:

a press unit including a resin molding die; and a cleaning unit for cleaning a molding face of the resin molding die, wherein the cleaning unit has an energy ray irradiation section, which irradiates an energy ray to the molding face of the resin molding die so as to easily peel off a contamination, which has been stuck during a molding action and left on the molding face, from the molding face, and the contamination is stuck onto resin of a molded product when the product is resin-molded, so that the molded product is released from the resin molding die together with the contamination.

With this structure, contaminations stuck on the molding face can be easily peeled off, and the contaminations are transferred to the molded product when the molded product is ejected or released from the resin molding die. Therefore, no contaminations are left on the molding face. In case of using highly adhesive resin, e.g., green resin, which firmly sticks to the resin molding die, contaminating the resin molding die (with resin) can be prevented.

In the resin molding machine, the energy ray irradiation section may include a plurality of energy ray sources. The energy ray sources may generate a plurality of energy rays having different wave lengths. The energy ray sources may irradiate an ultraviolet semiconductor laser, a blue semiconductor laser, a red semiconductor laser, an infrared semiconductor laser, a YAG laser and/or a $CO_2$ laser. Note that, the YAG laser and the $CO_2$ laser may be introduced by an optical fiber and/or a mirror.

By selecting the energy ray sources on the basis of the wave lengths, the resin left on the molding face can be easily removed therefrom, and the resin contamination stuck on the molding face can be activated so as to transfer the contamination onto the molded product.

In the resin molding machine, the cleaning unit may have a swinging mechanism, which swings the energy ray irradiation section in a direction perpendicular to or parallel to the moving direction of the energy ray irradiation section. By the swinging mechanism, the energy ray can uniformly irradiate the molding face.

In the resin molding machine, the cleaning unit may have a robot hand, which is separated from the press unit and which moves a cleaning head including the energy ray irradiation section so as to scan the molding face, or the cleaning unit may be provided to an off-load hand or a load hand, which is included in a feeding mechanism for feeding a work to and discharging the work from the press unit.

In the resin molding machine, the cleaning unit may have a release agent feeding section, which sprays mist of a release agent toward the molding face.

Further, the method of resin molding, in which an action for cleaning a molding face of a resin molding die with a cleaning unit is synchronized with a resin molding action, is characterized in, that an energy ray is irradiated toward the molding face from an energy ray irradiation section of the cleaning unit, every time one resin molding action or a plurality of resin molding actions are performed, so as to easily peel off a contamination, which has been stuck during the resin molding action and left on the molding face, from the molding face, and that the contamination is stuck onto resin of a molded product when the product is resin-molded, so that the molded product is released from the resin molding die together with the contamination.

In the method, the energy ray irradiation section may include a plurality of energy ray sources, the energy ray sources may generate a plurality of energy rays having different wave lengths, and the suitable energy ray source may be selected on the basis of the wave length.

In the method, the energy ray may be irradiated to the molding face on the basis of a position of an air vent, a cull section, a pot or a plunger, which is provided in the molding face.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

(Resin Molding Machine)

Figure 1:
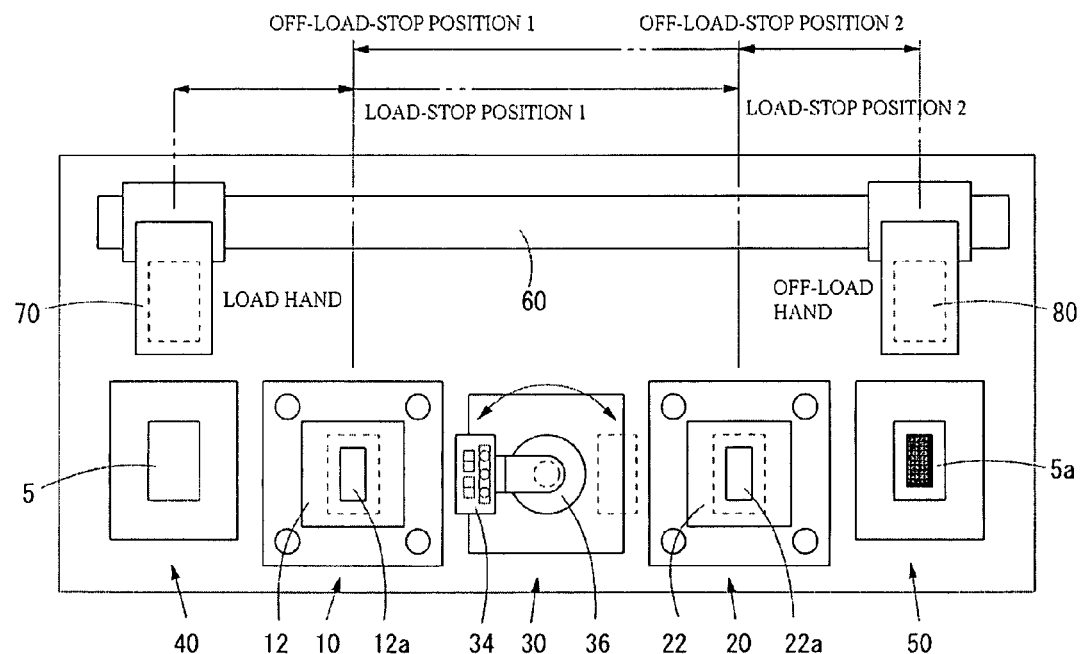
FIG. 1 is a plan view of an embodiment of a resin molding machine of the present invention.

FIG. 1 is a plan view of an embodiment of a resin molding machine of the present invention. The resin molding machine has a first press unit 10, a second press unit 20, and a cleaning unit 30, which is provided between the press units 10 and 20. A work loader 40 is provided on a side of the first press unit 10; a work off-loader 50 is provided on a side of the second press unit 20. The work loader 40, the first press unit 10, the cleaning unit 30, the second press unit 20 and the work off-loader 50 are linearly arranged in this order.

Structures of the first press unit 10 and the second press unit 20 are the same as a structure of a conventional press unit. Namely, each of the press units has a resin molding die, which is constituted by an upper die and a lower die for clamping a work, and a driving mechanism, which moves one of the upper die and the lower die upward and downward. In FIG. 1, cavities 12a and 22a are respectively formed in the lower dies 12 and 22.

The works 5 to be fed to the first press unit 10 and the second press unit 20 are accommodated in the work loader 40; molded products 5a are accommodated in the work off-loader 50.

A feeding mechanism, which feeds and discharges the works 5 and the molded products 5a, is arranged along the press units, etc. The feeding mechanism has a load hand 70, which transfers the works 5 from the work loader 40 to the press units 10 and 20, and an off-load hand 80, which transfers the molded products 5a from the press units 10 and 20 to the work off-loader 50. The load hand 70 and the off-load hand 80 are moved along a guide rail 60.

In FIG. 1, the load hand 70 is stopped at a load-stop position 1, at which the work 5 is fed to the first press unit 10, and a load-stop position 2, at which the work 5 is fed to the second press unit 20. On the other hand, the off-load hand 80 is stopped at an off-load-stop position 1, at which the molded product 5a is discharged from the first press unit 10, and an off-load-stop position 2, at which the molded product 5a is discharged from the second press unit 20.

The resin molding machine of the present embodiment is characterized by: a structure of the cleaning unit 30; and performing the resin molding with cleaning the resin molding die.

Figure 2:
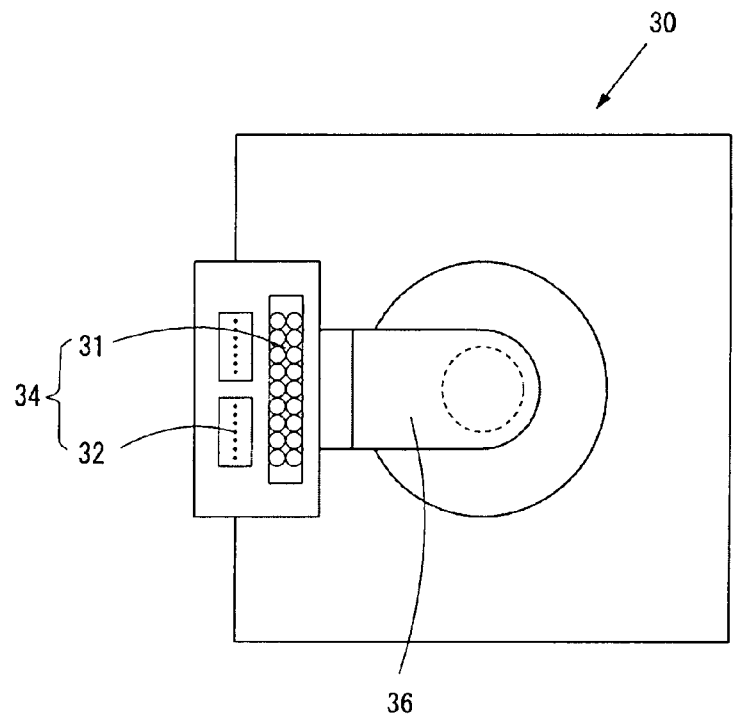
FIG. 2 is a plan view of a cleaning unit.

A plan view of the cleaning unit 30 is shown in FIG. 2. The cleaning unit 30 has: an energy ray irradiation section 31; a cleaning head 34 including a micro mist spray section 32, which acts as a release agent feeding section and sprays mist of a release agent; and a robot hand 36, which turns, extends and retracts the cleaning head 34.

The energy ray irradiation section 31 irradiates an energy ray toward a molding face of the resin molding die after completing a resin molding action so as to peel off resin dusts and resin components from the molding face or make them easily peelable. By irradiating the energy ray toward the molding face, contamination layers, which have been stuck on the molding face, is bent, or adhesion parts between the contaminations (contamination layers) and the molding face are burned, decomposed or broken. Therefore, an adhesive force between the molding face and the contaminations or the contamination layers can be lowered.

Laser means, which irradiates an ultraviolet semiconductor laser diode, a blue semiconductor laser diode, a red semiconductor laser diode, an infrared semiconductor laser diode, YAG laser or $CO_2$ laser, may be used as an energy ray source of the energy ray irradiation section 31. Note that, the YAG laser and the $CO_2$ laser may be introduced by an optical fiber and/or a mirror. Further, an LED, e.g., ultraviolet emitting diode, infrared emitting diode, may be used instead of the semiconductor laser means. These days, high power ultraviolet laser means has been provided. In the cleaning unit 30 of the present embodiment, the adhesive force between the molding face and the contaminations or the contamination layers is lowered by the energy ray. Therefore, the semiconductor laser means and the LEDs may be employed to lower the adhesive force the molding face and the contaminations.

In FIG. 2, a plurality of semiconductor laser sources are arrayed in the cleaning head 34. By arraying the energy sources and moving the cleaning head 34 so as to sweep the molding face with the energy ray irradiation section 31, the entire surface of the molding face can be cleaned.

The robot hand 36 turns the cleaning head 34 to alternately face the first press unit 10 and the second press unit 20 and extends an arm to object positions so as to make the cleaning head 34 enter the press units 10 and 20 and clean the resin molding dies.

Note that, a laser source (laser means) may be attached to the off-load hand 80, instead of the robot hand 36, so as to irradiate a laser beam to the molding face when the molded product is taken out from the resin molding die. Further, the micro mist spray section 32 may be attached to the load hand 70, instead of the robot hand 36, so as to make the micro mist spray section 32 enter the resin molding die without chucking the work 5 and feed the release agent to the resin molding die.

The micro mist spray section 32 attached to the cleaning head 34 sprays the release agent, which has been conventionally used to release molded products from a molding die, in the form of mist, whose average particle diameter is 20 μm, toward the molding face.

In a conventional resin molding method, the release agent is sprayed toward a molding face by a sprayer. Average particle diameter of the sprayed mist of the conventional method is 0.3 mm, a spray range thereof is about 1 m, and directivity thereof is high. Further, an amount of spraying the mist is great, so the mist is deposited on the molding face and formed into drops or a liquid. If the drops or liquid of the release agent invades into a package section of the work, reliability of the molded product will be lowered.

To solve the above described problem, in the present embodiment, the particle diameter of the mist is reduced to about 20 μm, and a minute amount of the mist is sprayed so as to sprinkle the one-layer release agent on the molding face by one spray action. By reducing the particle diameter of the release agent, momentum of the particles of the mist is made smaller and the directivity of the sprayed mist is lowered, so that the sprayed mist can be suitably diffused. Therefore, the molding face can be uniformly coated with the release agent without reference to the micro holes and the micro projections formed in the molding face.

To form the micro mist of the release agent, a specialized nozzle is attached to a spraying part of a conventional spray can of the release agent, and the nozzle is controlled by an actuator, e.g., electromagnetic solenoid, air cylinder.

(Method of Resin Molding)

The method of resin molding performed in the resin molding machine of the present embodiment will be explained.

Firstly, the work 5 is taken out from the work loader 40 and set in the first press unit 10 by the load hand 70 (at the load-stop position 1). In the first press unit 10, the work 5 is clamped by the resin molding die and resin-molded therein.

Next, another work 5 is taken out from the work loader 40 and set in the second press unit 20 by the load hand 70 (at the load-stop position 2). In the second press unit 20, the work 5 is clamped by the resin molding die and resin-molded therein.

When the work 5 is resin-molded in the first press unit 10 and the resin molding die is opened, the off-load hand 80 takes the molded product 5a from the first press unit 10 (at the off-load-stop position 1) and the molded product 5a is accommodated in the work off-loader 50.

Next, the first press unit 10 is cleaned. The cleaning action is performed while the resin molding die is opened. The robot hand 36 of the cleaning unit 30 moves the cleaning head 34 into the resin molding die, and then the energy ray irradiation section 31 irradiates the energy ray toward the molding face.

In FIG. 1, the cavity 12a is formed in the lower die 12 of the first press unit 10. The cleaning head 34 is moved into a space between the upper die and the lower die from a side of the first press unit 10, and the energy ray is irradiated toward the molding face of the lower die 12. In the present embodiment, the semiconductor laser means are arrayed as the energy ray sources, and the cleaning head 34 two-dimensionally scans the molding face by moving the cleaning head 34. Therefore, at least the entire cavity 12a can be irradiated by the laser beams while performing one cleaning action.

A moving speed of the cleaning head 34 is adjusted on the basis of degree of contamination (resin contamination) on the molding face when the molding face is cleaned by irradiating the laser beams. When the cleaning head 34 is moved, spattered dusts may be vacuum-sucked. In case that the resin contaminations firmly stick on the molding face, the cleaning head 34 is reciprocally moved a plurality of times with irradiating the laser beams. According to need, the micro mist spray section 32 sprays micro mist of the release agent toward the molding face when the cleaning head 34 enters the space between the upper die and the lower die. To high-densely distribute the release agent, the cleaning head 34 enters the space between the upper die and the lower die a plurality of times for spraying the release agent.

In case that cavities are formed in the upper die and the lower die of the first press unit 10 and resin contaminations stick on the both dies, the energy ray irradiation sections 31, e.g., arrayed semiconductor laser means, may be respectively provided on an upper face and a lower face of the cleaning head 34. By moving the cleaning head 34 into the space between the upper die and the lower die, the laser beams can irradiate the molding faces of the both dies.

After completing the irradiation of the molding face, the load hand 70 feeds a new work 5 to the opened resin molding die of the first press unit 10, and then the resin molding die clamps the new work 5 for resin molding.

As described above, the energy ray, e.g., laser beam, is irradiated so as to lower the adhesive force between the molding face and the resin contaminations or easily peel off the contaminations from the molding face.

Figure 3A:
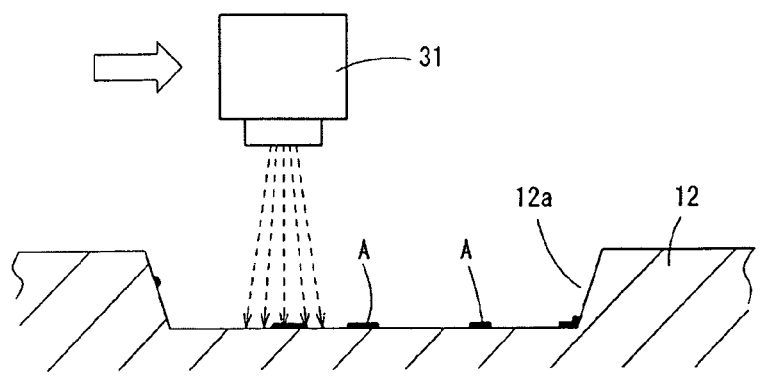
FIGS. 3A-3D are explanation views showing a resin molding action with irradiating an energy ray toward a resin molding die.
Figure 3B:
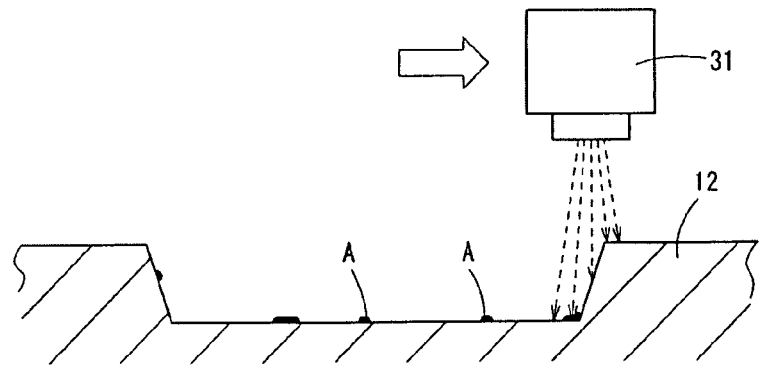
Figure 3C:
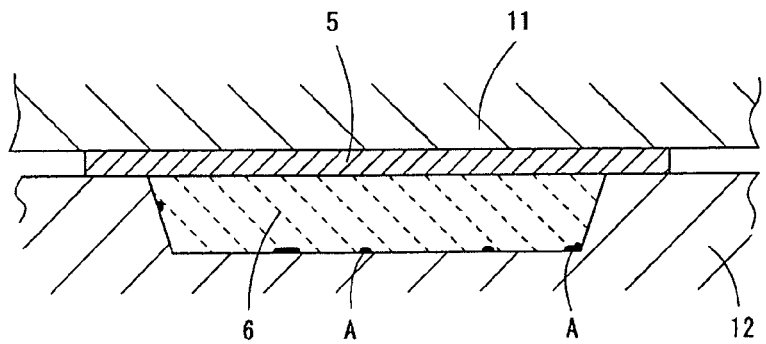
Figure 3D:
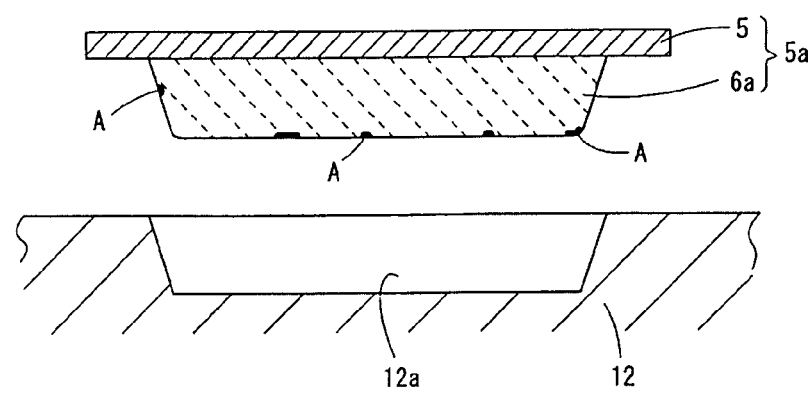

FIGS. 3A-3D are explanation views showing the resin molding action with irradiating the energy ray toward the molding face. In FIGS. 3A and 3B, the energy ray irradiation section 31 irradiates the energy ray toward the molding face of the lower die 12; in FIG. 3B, the work 5 is clamped between the upper die 11 and the lower die 12 for resin molding; in FIG. 3D, the molded product 5a is released from the lower die 12.

As shown in FIGS. 3A and 3B, the energy ray irradiation section 31 is moved to scan the molding face, so that the laser beams are irradiated toward a resin contamination A, which has stuck on the molding face. By the irradiation, the contamination A is heated and decomposed, so that it can be easily peelable. In this state, the work 5 is resin-molded (see FIG. 3C), and the contamination A is integrated with resin 6. Finally, the contamination A is released from the molding face together with molded resin 6a (see FIG. 3D). Namely, by employing the method of the present embodiment, the contamination A is made easily peelable by irradiating the laser beams toward the molding face, and the contamination A is integrated with the resin 6, so that the contamination A can be discharged from the resin molding die together with the molded product 5a.

In the method of the present embodiment, contaminations can be discharged from the resin molding die together with the molded product 5a every time the molding action is performed. Therefore, the resin molding action is performed with cleaning the molding face, so that depositing contaminations onto the molding face of the resin molding die can be prevented.

In the resin molding machine of the present embodiment, the cleaning head 34 is turned toward the second press unit 20 after completing the cleaning action in the first press unit 10, the work 5 is resin-molded in the second press unit 20, the off-load hand 80 takes out the molded product 5a at the off-load-stop position 2, and then the cleaning head 34 of the cleaning unit 30 enters a space between the upper die and the lower die so as to clean the molding face. The energy ray irradiation section 31 irradiates the laser beams to clean the molding face of the second press unit 20 as well.

In the present embodiment, the molding actions of the first press unit 10 and the second press unit 20 are alternately performed. The robot hand 36 of the cleaning unit 30 is synchronously turned with the molding actions. Therefore, the first press unit 10 and the second press unit 20 can be cleaned by one cleaning unit 30. Note that, a plurality of the cleaning units 30 may be respectively provided to the press units.

The cleaning action may be performed every time one resin molding action or a plurality of resin molding actions are performed.

When the cleaning head 34 cleans the molding face, a laser beam having a prescribed width may be irradiated so as to irradiate the entire molding face by performing the cleaning action prescribed times (N times). A 1/N area of the molding face is swept or scanned by one cleaning action, and the laser beam is gradually shifted, so that the entire molding face can be cleaned by performing the cleaning action N times. Unlike a method of irradiating the entire molding face at one time, the cleaning action of the present embodiment is performed by dividing the area of the molding face and repeating the partial irradiation of the laser beam, so that overheating the resin molding die can be prevented. Further, the laser irradiation can be completed while the resin molding die is mechanically cleaned, e.g., cleaning with brush, so lowering of manufacturing efficiency can be prevented.

(Energy Ray Irradiation Section for Plane Irradiation)

Figure 4:
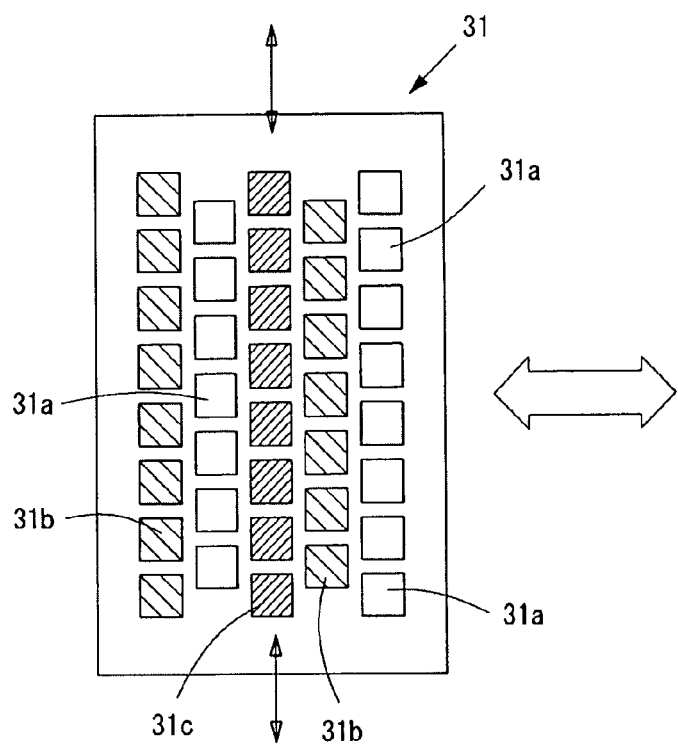
FIG. 4 is an explanation view showing an arrangement of semiconductor laser sources.

The energy ray sources, e.g., semiconductor laser means, may be optionally arranged in the energy ray irradiation section 31. In FIG. 4, lines of semiconductor laser means are arranged in the energy ray irradiation section 31. Three kinds of semiconductor laser means 31a, 31b and 31c, which have different wave lengths, are respectively linearly arranged. The semiconductor laser means in one line are shifted, with respect to those in the adjacent line, in the longitudinal direction of the line. In FIG. 4, the adjacent semiconductor laser means are mutually shifted ½ pitch. The cleaning head 34 is moved in a direction shown by an arrow so as to sweep or scan the molding face. In FIG. 4, the semiconductor laser means 31a, 31b and 31c are respectively linearly arranged in the direction perpendicular to the moving direction of the cleaning head 34, and the adjacent semiconductor laser means are mutually shifted in a zigzag, so that the entire molding face can be near-uniformly irradiated by the semiconductor laser means 31a, 31b and 31c when the cleaning head 34 scans the molding face.

The shift length between the semiconductor laser means in the adjacent lines may be optionally designed so as to uniformly irradiate the molding face when the cleaning head 34 scans the molding face. In the present embodiment, the semiconductor laser means in one line are shifted with respect to those in the adjacent line so as to uniformly irradiate the laser beams toward the molding face by the laser means when the cleaning head 34 scans the molding face. Therefore, in case of arraying the semiconductor laser means as shown in FIG. 2, a heading of the cleaning head 34 may be slightly skewed with respect to the direction perpendicular to the scanning direction of the cleaning head 34, when the cleaning head 34 scans the molding face, so as not to parallelize (overlap) the scanning direction of the cleaning head 34 and the arranging direction of the semiconductor laser means. With this manner, the laser beams can uniformly irradiate the molding face.

In case that the energy ray irradiation section 31 is held by a swinging mechanism, which is capable of swinging the energy ray irradiation section 31 in the direction perpendicular to the scanning direction, and the energy ray irradiation section 31 irradiates the laser beams while the energy ray irradiation section 31 is swung in said direction, intensity of the laser beams irradiating the molding face can be equalized.

By providing a plurality of kinds of the semiconductor means which have different wave lengths in the energy ray irradiation section 31, the energy rays differently work to contaminations (resin contaminations) stuck on the molding face. Namely, the contaminations can be effectively peeled off or made easily peelable. For example, infrared laser beams permeate the resin contaminations stuck on the molding face and are converted into thermal energy on the molding face, so that organic matters on the molding face are burned and the contaminations are peeled off. Ultraviolet laser beams are absorbed into surfaces of the resin contaminations stuck on the molding face and oxidize or activate organic matters, so that binding force between the mold resin for molding a work and the resin contaminations is increased. Therefore, the contaminations can integrated with the mold resin and can be removed together with the mold resin of the molded product.

In case that the energy ray irradiation section 31 has a plurality of kinds of the semiconductor laser means having different wave lengths, all of the semiconductor laser means may irradiate the laser beams, or selected semiconductor laser means having a specific wave lengths may irradiate the laser beams. Further, one kind of the semiconductor laser means may irradiate the laser beams when the cleaning head 34 enters the resin molding die, and another kind of the semiconductor laser means may irradiate the laser beams when the cleaning head 34 comes out from the resin molding die.

Note that, in the above description, the semiconductor laser means are provided to the energy ray irradiation section 31. Semiconductor diodes, which irradiate mere infrared rays or ultraviolet rays, may be employed as well as the semiconductor laser means.

EXPERIMENTAL EXAMPLE

An experiment of cleaning a molding face of a molding die, which has been fluorinated, with ultraviolet laser beams having a wave length of 375 nm was performed. The energy ray irradiation section included four lines of ultraviolet laser means, which were arranged in parallel and in each of which was constituted by 11 ultraviolet laser means, so as to cover the entire width of the resin molding die (width: 170 mm). In each of the ultraviolet laser means (average output power: 100 mW), 27 laser chips, whose size was 280 μm×280 μm, were encapsulated in a package, whose size was 14.5 mm×14.5 mm.

The energy ray irradiation section irradiated the molding face for 50 seconds every time five molding actions were performed, and contamination of the molding face was visually observed. The contamination less grew on the molding face. Further, no contamination was transferred onto a surface of a package (a molded product).

Further, the energy ray irradiation section irradiated the molding face for 50 seconds, every time five molding actions were performed, until reaching 300 molding actions, and contamination of the molding face was visually observed. Some resin contaminations were observed, but no contamination was transferred onto a surface of the package.

According to the experiment, the cleaning function of the ultraviolet semiconductor laser to resin contaminations was verified. These days, wave lengths of ultraviolet laser means are shortened, and output powers thereof are improved. By using a high power semiconductor laser means, the molding face can be effectively cleaned.

In case of arranging four lines of semiconductor laser means in the energy ray irradiation section, all of the lines may be constituted by ultraviolet semiconductor laser means, or two lines of ultraviolet semiconductor laser means and two lines of infrared semiconductor laser means may be combined. By using a plurality of kinds of laser means having different wave lengths, e.g., ultraviolet semiconductor laser means and infrared semiconductor laser means, various kinds of contaminations on the molding face can be removed. Therefore, the molding face can be effectively cleaned.

If the laser means are detachably attached to the energy ray irradiation section, output powers and/or wave lengths of the laser means can be easily changed.

(Energy Ray Irradiation Section for Line Irradiation)

Figure 5:
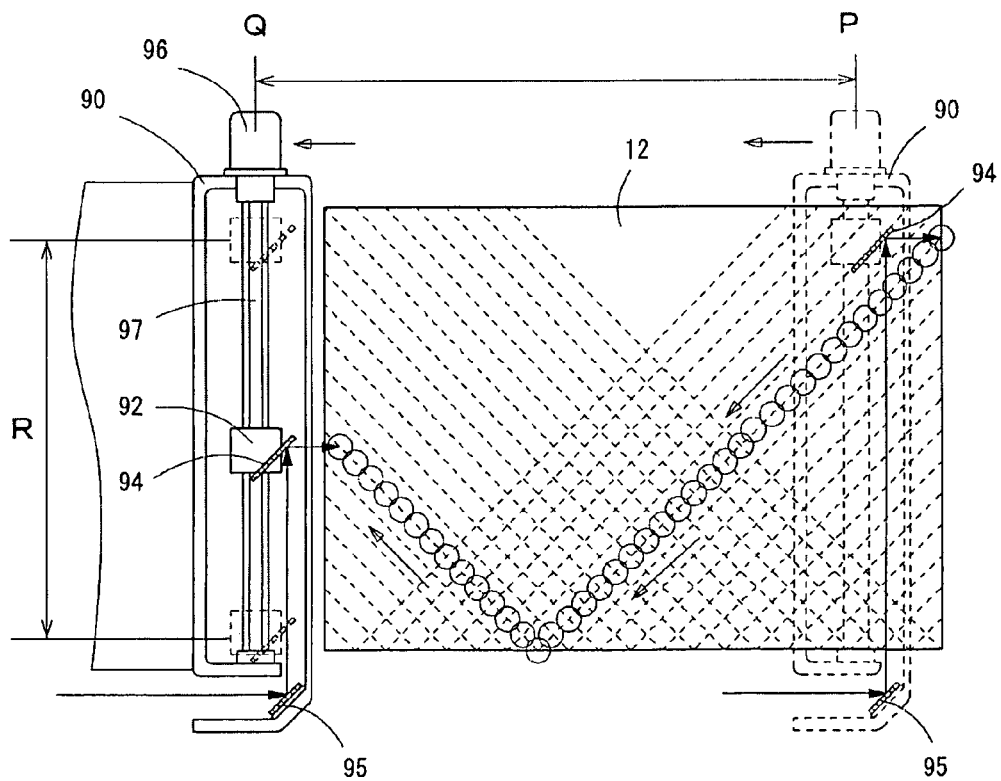
FIG. 5 is an explanation view showing another method for removing contaminations by irradiating a laser beam toward a molding face.

FIG. 5 shows another method of removing resin contaminations, in which a laser beam is linearly irradiated. In the present embodiment, the laser means irradiating the laser beam includes: a slider 90 being reciprocally moved in parallel with the molding face between an interior position, which is located in the resin molding die, and an exterior position, which is located outside of the resin molding die; and a moving member 92 being provided in the slider 90 and capable of moving in a direction perpendicular to a moving direction of the slider 90. The laser beam, which has been introduced from a laser source to the slider 90 via a first mirror 94 provided to the moving member 92, irradiates the molding face as a spot beam. For example, a YAG laser unit is used as the laser unit (laser means). The laser beam emitted from the laser unit is reflected by a second mirror 95, which is fixed to a side part of the slider 90 so as to introduce the laser beam to the first mirror 94.

The slider 90 is supported by a guide rail and moved to and away from the press unit by a driving mechanism. A moving member 92 is screwed with a ball screw 97, which is rotated by a motor 96, and engaged with a slide guide for moving in the direction perpendicular to the moving direction of the slider 90. An axial line of the ball screw 97 is arranged perpendicular to the moving direction of the slider 90. The moving member 92 is capable of moving within the entire width of the die 12.

In FIG. 5, the slider 90 is moved from the interior position P in the die 12 to the exterior position Q, and the spot laser beam irradiates the die 12 while moving the slider 90. A track of the spot laser beam is indicated by small circles. The laser beam introduced from the laser source to the slider 90 is reflected by the second mirror 95 and the first mirror 94 so as to irradiate the molding face. In the present embodiment, the motor 96 is driven so as to move the moving member 92 on the ball screw 97 and irradiate the molding face with the laser beam while the slider 90 is moved from the position P to the position Q. The moving member 92 can be moved within a shown range R. The moving member 92 is moved, on the molding face, in X-Y-directions. The laser beam is emitted, by the laser source, at regular time intervals, so that beam spots of the laser beam are partially overlapped and moved along the shown continuous track. By controlling moving speeds of the slider 90 and the moving member 92, the moving member can be linearly moved and the track of the laser beam is zigzagged as shown in FIG. 5.

When the spot laser beam irradiates the molding face, the laser beam is suitably diffused and energy density of the laser beam is lowered so as not to damage the molding face. In case that a spot diameter of the laser beam is large, energy density of the center of the spot beam is different from that of an outer part thereof. Therefore, the track of the laser beam is shifted every time the scanning action is performed so as to overlap the beam spots, so that the laser beam can uniformly irradiate the entire molding face. For example, in case of the laser beam having the spot diameter of 20 mm, the scanning track of the laser beam may be shifted about 10 mm for next scanning action. By using the diffused spot laser beam, an efficiency of scanning the molding face can be improved.

The beam spots for one scanning action of the slider 90 are shown in FIG. 5. In the present embodiment, the laser scanning action is performed for each resin molding action. In the next scanning action, the starting spot of the scanning action (scan-starting position) is shifted one pitch from that of the previous time. By shifting one pitch, the starting spot of the next scanning action and that of the previous scanning action are overlapped. The entire molding face can be irradiated by the laser beam by repeating the scanning action. Namely, the entire molding face is not irradiated by one scanning action; the laser beam can irradiate the entire molding face by repeating the scanning action prescribed times (N times).

To irradiate the entire molding face by repeating the scanning action N times, the spot diameter of the spot laser beam, a shift length of the starting spot thereof and the time interval of emitting the laser beam are adjusted. The laser spots must be mutually overlapped. In the present embodiment, the laser beam is moved from the position P to the position Q, but the laser beam may be moved from the position Q to the position P.

Since the entire molding face by repeating the scanning action N times, the number N is determined so as to return the laser spot to the initial starting spot (scan-starting position) while the cleaning function of the laser beam is left.

By irradiating the entire molding face by performing the scanning action N times, overheating the molding face and scattering resin contaminations can be prevented, so that resin contaminations can be effectively removed.

(Scanning Action)

In FIG. 5, the off-load hand 80 is moved in the P-Q direction, the slider 90 is attached to the off-load hand 80, and the slider 90 is reciprocally moved together with the off-load hand 80. A length (a length in the P-Q direction) of the resin molding die is 200 mm, and a width (a width in a direction perpendicular to the P-Q direction) of the resin molding die is 150 mm.

Firstly, the moving member 92 is fixed at a position which is inwardly shifted 10 mm from a side edge of the lower die, the molding action is performed, and then a heading of the first mirror 94 is changed so as to make the laser beam irradiate the upper die in a state of opening the resin molding die. In this state, the off-load hand 80 is moved into the resin molding die with irradiating the laser beam and scanning the upper die. When the resin molding die is opened, the molded product is mounted on the lower die, so the molding face of the upper die can be cleaned by moving the off-load hand 80 into the resin molding die and irradiating the laser beam toward the upper die.

After the off-load hand 80 reaches the inmost position and the laser beam scans the entire length of the upper die, the first mirror 94 is headed toward the lower die, the molded product is chucked by the off-load hand 80, and then the off-load hand 80 is moved outward with irradiating the laser beam and scanning the lower die.

As described above, the off-load hand 80 is moved into the resin molding die with irradiating the laser beam toward the upper die, and the off-load hand 80 is moved outward with irradiating the laser beam toward the lower die. Then, the moving member 92 is inwardly shifted one pitch (10 mm) in the width direction for the next scanning action. With this manner, the upper die and the lower die are scanned by the laser beam every time the resin molding action is performed. Scanning the entire molding face by the laser beam is performed when the moving member 92 is shifted 150 mm in the width direction.

In case that air vents are formed and arranged in the longitudinal direction of the resin molding die, the position of the moving member 92 is corresponded to that of the air vent, and the laser beam irradiates the air vents of the upper die and the lower die. Generally, two works are symmetrically set in one resin molding die, and two air vents are formed at side edges of each cavity. Therefore, four molding actions must be performed so as to irradiate all of the air vents. To irradiate and scan the entire molding face including the air vents, the resin molding action must be performed, for example, 19 times.

In case that the laser unit is capable of emitting 20 laser beams per second and the moving speed of the off-load hand 80 is 200 mm/sec., the resin molding die whose length is 200 mm can be scanned for one second. In the actual resin molding machine, the off-load hand 80 is moved 200 mm for about four seconds because brushing means and sucking means are further used. Therefore, the resin molding efficiency of the molding machine is not lowered by employing the laser cleaning action (scanning action).

In case that the laser unit is capable of emitting 20 laser beams per second and the moving speed of the off-load hand 80 is 50 mm/sec., the laser beams whose spot diameters are 20 mm are irradiated with the intervals of 2.5 mm, so that a cleaning power can be improved. Further, the shift pitch of the moving member 92 can be 15 mm, so that the entire molding face can be laser-scanned by performing the resin molding action 10 times.

In the above described embodiment, the air vents are also irradiated by the laser beam. On the other hand, in case of using green resin, which can firmly stick to the molding face, resin contaminations in the air vents are sometimes more serious than those on cavity faces. Therefore, it is effective to irradiating the laser beam to the air vent to remove resin contaminations therefrom.

In the above described embodiment, the laser beam emitted from the laser source is introduced to the first mirror 94 via the second mirror 95. The laser beam, whose beam diameter has been increased by an optical device, e.g., expander, may be introduced to the second mirror 95 via an optical fiber. Further, the laser beam may be introduced to the first mirror 94 via an optical fiber instead of the mirror. Namely, the means for introducing the laser beam from the laser source to the slider 90 is not limited.

In case of linearly irradiating the laser beam to the molding face to remove resin contaminations, a plurality of laser sources, whose wave lengths are different, may be used as well as the above described case, wherein a plurality of the semiconductor laser means having different wave lengths are used. For example, in case of using YAG laser sources, a first source, which emits a laser beam having a fundamental wave length of 1064 nm, and a second source, which emits a higher harmonic laser beam having a wave length of 532 nm, are selectively or simultaneously used. In case of using the two laser beams, two first mirrors 94 and two second mirrors 95, which are respectively corresponded to the laser wave lengths, e.g., 1062 nm and 532 nm, are provided.

The surfaces of the resin molding die of the present embodiment may be fluorinated or treated with an organic material, e.g., triazine-thiol. In comparison with a resin molding die whose surfaces are treated with an inorganic material, heat resistance of the resin molding die of present embodiment is lower. However, if fewer contaminations stick on the molding face, the molding face can be cleaned with a small amount of energy ray irradiation. Therefore, overheating the resin molding die can be prevented, so that the molding face can be cleaned without being damaged.

In the present embodiment, the molding face is cleaned every time one or a plurality of the resin molding actions are performed, so the molding face can be cleaned before contaminations thickly deposit or firmly stick onto the molding face. In case of using green resin which can firmly stick to the molding face, the resin molding action can be performed with cleaning the molding face.

The molding face is cleaned, by irradiating the energy ray to the resin molding die, every time one or a plurality of the resin molding actions are performed. Therefore, unlike the conventional machine, the resin molding die of the present embodiment can be cleaned without stopping a manufacturing line so as to detach the resin molding die from the press unit and irradiate the energy ray toward the detached resin molding die, so that production efficiency can be improved.

In the present embodiment, the energy ray is irradiated toward the molding face, further parting faces of the resin molding die are brushed and dusts are vacuum-sucked and discharged. Resin fins formed on the parting faces are thick contaminations, so they can be mechanically peeled off and removed by a rotary brush. Brushing the parting faces is performed in the conventional resin molding machine. Even if the cleaning unit 30 cleans the resin molding die for each resin molding action, the production efficiency of the resin molding machine of the present embodiment is not lower than that of the conventional machine.

In the present embodiment, the energy ray, e.g., laser beam, is irradiated to make resin contaminations easily peelable from the molding face without excessively heating the resin molding die. Therefore, a high power energy ray source is not required, so that the structure of the resin molding machine can be simplified and an energy ray irradiation time can be shortened.

EXPERIMENTAL EXAMPLE

A laser beam was irradiated toward a specified place on the molding die, and then nature change of the molding face was inspected. Further, removing resin contaminations was evaluated.

A Yb-YAG laser beam (an average output power was 10 W; a wave length was 1064 nm; a pulse width was 30 nsec.; and an irradiation cycle was 1000 Hz) was focused by a condenser lens (a focal distance: 190 mm). A spot diameter of the laser beam was 60 µm. The laser beam was irradiated toward the molding face, which had been hard-plated with Cr, and then the molding face was melted. Therefore, the resin molding die was unusable. Next, the focal point was shifted so as to change the spot diameter of the laser beam to 1 mm. In this case, the resin molding die was not damaged.

A Yb-YAG laser beam (an average output power was 10 W; a wave length was 1064 nm; a pulse width was 200 nsec.; and an irradiation cycle was 5 Hz) was used as a laser beam having a diameter of 15 mm. The laser beam was irradiated toward the molding face after 300 resin molding actions were performed. Resin contaminations stuck on the molding face were blown off and removed. The laser beam, whose diameter was 15 mm, was irradiated to the molding face 2000 times, but the molding face was not damaged.

A continuous wave Yb-YAG laser beam (an average output power was 10 W; a wave length was 1064 nm; and a laser power was reduced to 70%) was used as a parallel laser beam having a diameter of 20 mm. The laser beam was irradiated toward the molding face after 300 resin molding actions were performed. Resin contaminations stuck on the molding face were not blown off. After irradiating the laser beam, the resin molding action was performed. About 20% of the resin contaminations were transferred from the molding face to a molded product. Namely, the laser beam made the resin contaminations easily peeled off from the molding face.

Further, a continuous wave Yb-YAG laser beam (an average output power was 10 W; a wave length was 1064 nm; and a laser power was reduced to 70%) was used as a parallel laser beam having a diameter of 20 mm. The laser beam was irradiated toward the molding face after 100 resin molding actions were performed. Resin contaminations still covered about 85% of a cavity in the molding face. After irradiating the laser beam, the resin molding action was performed. A part of the resin contaminations were transferred from the molding face to a molded product. About 20% of the resin contaminations left in the cavity. Afterward, the laser beam was irradiated toward the molding die under the same conditions every time 100 resin molding actions were performed, and the contaminations were visually observed until 300 resin molding actions were performed. 25% of the resin contaminations left on the molding face, but no contaminations were transferred to the molded product. Namely, growth of the resin contaminations on the molding face was restrained by the laser beam. Contaminating the resin molding die was restrained, so that the transfer of the resin contamination was also restrained.

The above described method, in which the energy ray makes the contaminations on the molding face easily peeled off, may be applied to another resin molding method, in which a molding face (a cavity) is covered with a release film. By using the release film covering the resin molding face, no resin directly contacts the molding face, but some contaminations will stick onto the molding face by repeating the resin molding actions.

The contaminations may be removed by the steps of: irradiating the energy ray toward the molding face through the release film so as to make the contaminations easily peelable from the molding face; performing the resin molding action with pressing the release film onto the contaminations, by resin pressure, so as to transfer the contaminations to the release film; and conveying the used release film to a collecting roll together with the contaminations.

(Spraying Mist of Release Agent)

In case of cleaning the molding face by irradiating the energy ray, e.g., laser beam, if the molding face is excessively cleaned, resin directly contacts and chemically binds with the molding face firmly. Further, micro holes and micro projections are formed in the molding face, so it is difficult to release a molded product from the resin molding die. To easily release the molded product from the resin molding die, mist of a release agent is sprayed toward the molding face from the micro mist spray section 32 of the cleaning head 34.

Spraying the micro mist of the release agent toward the molding face may be performed for each resin molding action. The micro mist of the release agent is usually sprayed every time several times of the resin molding actions are performed. When the cleaning head 34 is moved into the resin molding die, the micro mist of the release agent can be sprayed from the micro mist spray section 32 toward the molding face. The micro mist spray section 32 is provided to a front end of the cleaning head 34, the energy ray irradiation section 31 irradiates the energy ray toward the molding face when the cleaning head 34 is moved into the resin molding die, and the micro mist spray section 32 sprays the mist of the release agent when the cleaning head 34 is moved outward. With this action, the energy ray irradiation section 31 is not soiled by the release agent.

Figure 6A:
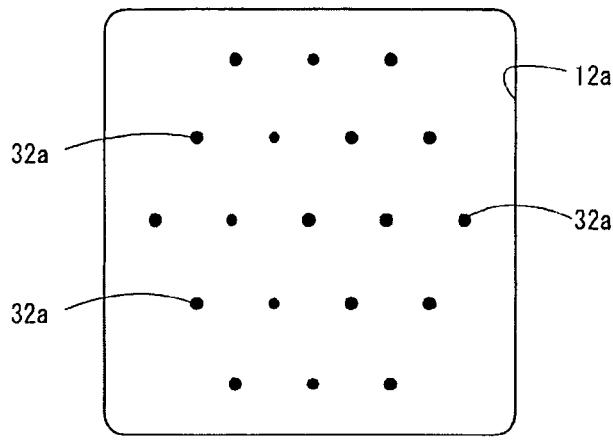
FIGS. 6A-6D are explanation views showing another resin molding action with spraying mist of a release agent toward the resin molding die.
Figure 6B:
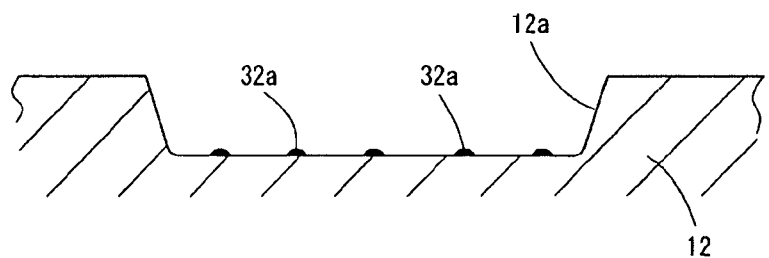
Figure 6C:
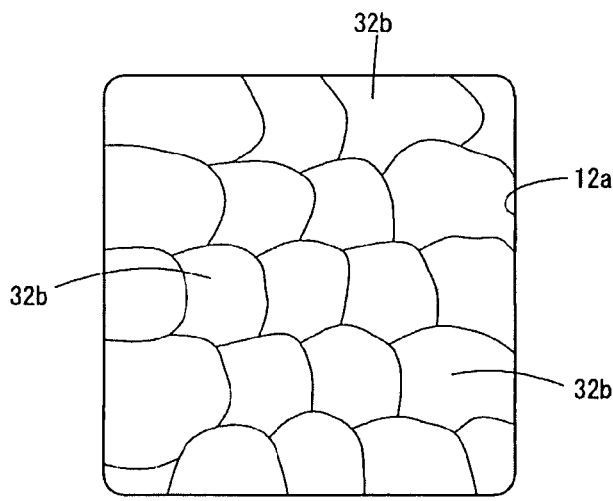
Figure 6D:
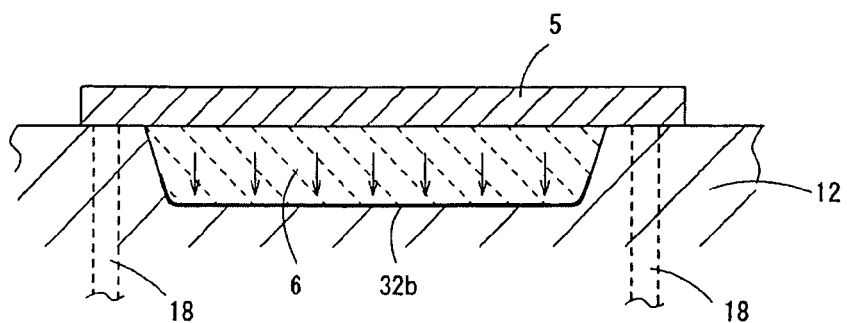

FIGS. 6A and 6B show a state, in which drops 32*a* of the release agent stick on an inner bottom face of the cavity 12*a*; FIGS. 6C and 6D show a state, in which the work 5 is resin-molded and the drops 32*a* of the release agent are pressed and extended, by resin pressure, on the inner bottom face of the cavity 12*a*. Symbols 32*b* stand for the release agent membranously extended.

The release agent is fed onto the molding face in the form of thin drops. The drops of the release agent are membranously extended by resin pressure, so that the molded product can be easily released from the molding face.

By performing the resin molding action with spraying the mist of the release agent from the micro mist spray section 32 toward the molding face, the work can be molded with resin including no release agent. Therefore, highly-reliable parts, e.g., automobile parts, and high characteristic optical parts, e.g., LED, can be easily resin-molded.

In the method wherein the resin molding action is performed with spraying the mist of the release agent from the micro mist spray section 32 toward the molding face, the resin molding action can be suitably performed, without losing releasability of the molded product, by further adding the above described cleaning action. Green resin, which firmly sticks to the molding face, can be easily used for resin molding.

In the present embodiment, the micro mist spray section 32 is attached to the cleaning head 34, but the micro mist spray section 32 may be attached to a separated conveying mechanism. Further, the micro mist spray section 32 may be attached to the load hand 70 or the off-load hand 80, which constitutes the feeding mechanism.

In the resin molding machine of the present embodiment, the cleaning unit 30 is provided between the first press unit 10 and the second press unit 20. Further, four press units and two cleaning units may be combined. Four press units may be cleaned by one cleaning unit. Namely, a plurality of the press units and a plurality of the cleaning units may be optionally combined. The press units may be used as modules and optionally combined. The cleaning head 34 may be provided to a front end of an unloader hand (off-load hand) as well as a cleaning mechanism of the conventional resin molding machine, which includes the brush means and the sucking means.

Figure 7:
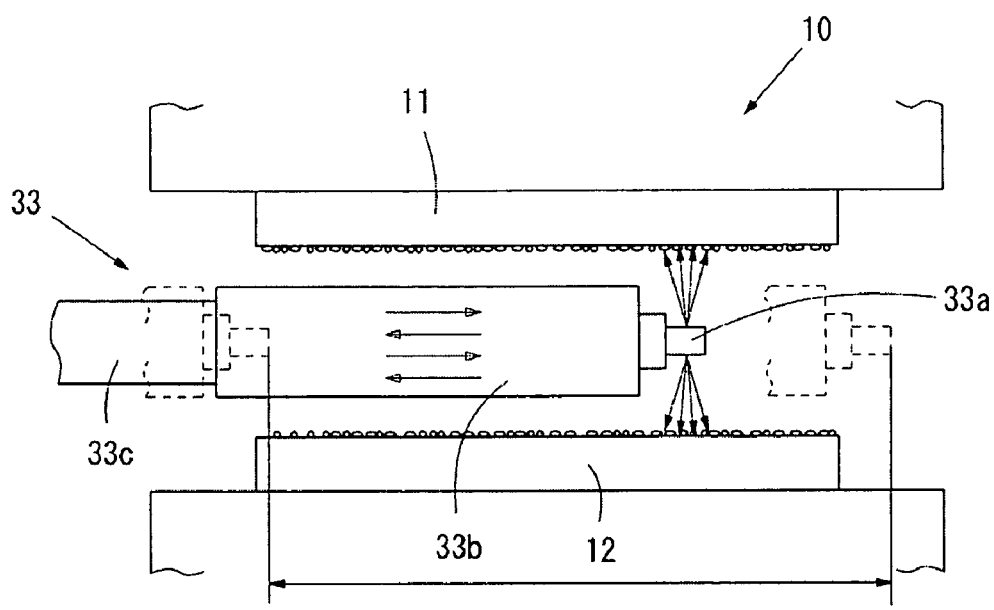
FIG. 7 is an explanation view of a spray section for spraying mist of the release agent.

In FIG. 7, a micro mist spray section 33 sprays the micro mist of the release agent toward the molding faces of the upper die 11 and the lower die 12 of the first press unit 10. The micro mist spray section 33 has a main body part 33*b*, in which a nozzle head 33*a* is provided to a front end, and a supporting arm 33*c*, which is connected to a driving mechanism for reciprocally moving the main body part 33*b* parallel to the molding face. The nozzle head 33*a* has spray holes, which are respectively face the upper die 11 and the lower die 12, so that the release agent can be simultaneously sprayed toward the molding faces of the upper die 11 and the lower die 12.

In the micro mist spray section 33, the main body part 33*b* provides a spray can, and the spray can is detachably attached to the main body part 33*b*. The release agent can be changed by exchanging the spray can. Spraying the release agent is started and stopped by actuating the nozzle head 33*a*, which is provided to the main body part 33*b* and actuated by a suitable actuator, e.g., solenoid. An electric circuit for spraying the release agent, which includes a piezo element, may be provided to the nozzle head 33*a* instead of the actuator, e.g., solenoid. In this case, starting and stopping the spray, spray time, particle diameter of the mist and density of the mist can be controlled by controlling the piezo element.

When the micro mist spray section 33 is moved into or come out from the resin molding die, the nozzle head 33*a* is moved parallel to the molding face and the release agent is sprayed form the nozzle head 33*a*. Therefore, the release agent can be simultaneously fed to the molding faces of the upper die 11 and the lower die 12. Amount of feeding the release agent can be controlled by adjusting a moving speed of the micro mist spray section 33. The amount of the release agent is increased by reducing the moving speed of the micro mist spray section 33; the amount of the release agent is reduced by increasing the moving speed thereof. In case of increasing the amount of the release agent, the moving speed of the micro mist spray section 33 is lowered so that the mist piles and grows on the molding face. Further, the mist cannot be uniformly distributed. Preferably, in case of increasing the amount of the release agent, the micro mist spray section 33 is reciprocally moved without reducing the moving speed.

By reciprocally moving the micro mist spray section 33 a plurality of times, the release agent which has been initially sprayed onto the molding face is absorbed into the micro holes, etc. by the capillary phenomenon, so the release agent is not floated on the molding face. Therefore, binding between the former mist and the new mist is restrained, so that the release agent can be uniformly fed onto the molding face. By uniformly feeding the release agent onto the molding face, the molded product can be easily released from the resin molding die. In case of resin-molding an LED, if the release agent is not excessively fed to the molding face, a trace of the release agent causes an optical blur formed like an oil film. Therefore, it is effective to thinly and uniformly feed the release agent.

The micro mist spray section 33 may spray the release agent by using the venture effect with compressed air, instead of using the spray can. In this case, particle diameter of the mist and the amount of feeding the mist can be controlled by controlling pressure of the compressed air. Further, in this case, one or a plurality of nozzles are headed toward the cavity formed in the resin molding die, and one of a plurality of other nozzles are headed toward a pot, a plunger and a cull section. The release agent is sprayed from the nozzles toward them. A nozzle block holding the nozzles is attached to a front end of the load hand 70 or the off-load hand 80. By moving the nozzle block between the upper die and the lower die with supplying the compressed air, the release agent can be sprayed toward the molding faces of the upper die and the lower die.

Further, the release agent may be sprayed by using ultrasonic vibration. By applying ultrasonic vibration to a liquid of the release agent, the release agent is formed into the mist. In the micro mist spray section, the mist is sprayed by suitable air-blowing means. By moving the micro mist spray section between the upper die and the lower die, the mist of the release agent can be sprayed toward the molding faces of the upper die and the lower die. The particle diameter of the mist and the amount of feeding the mist can be controlled by controlling the ultrasonic vibration and the air-blowing means.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A resin molding machine,
comprising:
a press unit including a resin molding die; and
a cleaning unit having a cleaning head movable to and away from the resin molding die for cleaning a molding face thereof,
wherein the cleaning head includes:
an energy ray irradiation section including a plurality of energy ray sources, arranged to form into a plurality of lines for irradiating energy rays to the molding face of the resin molding die;
a moving mechanism moving the energy ray irradiation section, along the molding face, so as to scan the molding face;
a swinging mechanism swinging the energy ray irradiation section in a direction perpendicular to the scanning direction of the energy ray irradiation section; and
a release agent feeding section spraying mist of a release agent toward the molding face;
wherein the energy ray sources, which are arranged to form into the plurality of lines, are mutually shifted in a direction perpendicular to the scanning direction of the energy ray irradiation section; and
wherein the energy ray irradiation section scans the molding face with irradiating energy rays and the swinging mechanism swings the energy ray irradiation section, which is scanning with irradiating energy rays, in the direction perpendicular to the scanning direction without changing a distance to the molding face when the cleaning unit enters the molding die, the release agent feeding section sprays mist of the release agent when the cleaning unit returns, every time one or a plurality of the resin molding actions are performed, thereby the contamination of the molding die is stuck onto resin of a molded product when the next product is resin-molded, so that the next molded product is released from the resin molding die together with the contamination.

2. The resin molding machine according to claim 1, wherein the energy ray sources generate a plurality of energy rays having different wave lengths.

3. The resin molding machine according to claim 1, wherein the energy ray sources irradiates an ultraviolet semiconductor laser, a blue semiconductor laser, a red semiconductor laser, an infrared semiconductor laser, a YAG laser and/or a $CO_2$ laser.

4. The resin molding machine according to claim 1, wherein the cleaning unit has a robot hand, which is separated from the press unit and which moves a cleaning head including the energy ray irradiation section so as to scan the molding face.

5. The resin molding machine according to claim 1, wherein the energy irradiation unit is provided to an off-load hand, which takes out the molded product from the molding die, instead of the cleaning unit, the release agent feeding section is provided to a load hand, which feeds a work to the molding die, instead of the cleaning unit, and
energy rays are irradiated to the molding face of the resin molding die when the off-load hand takes out the molded product, the release agent is sprayed when the load hand enters the molding die without chucking the work.

6. The resin molding machine according to claim 1,
wherein the energy ray irradiation section includes means for spot-irradiating the energy ray on the molding face and linearly moving the energy ray thereon, and a scan-starting position of the energy ray is shifted for each scanning action so as to overlap spot-irradiation areas, so that the energy ray irradiates the entire molding face by performing the scanning action prescribed times.

7. The resin molding machine according to claim 6,
wherein the means for linearly moving the energy ray comprises:

a slider reciprocally moving so as to scan the molding face; and a moving member moving in a direction perpendicular to the moving direction of the slider, and the energy ray is introduced to the molding face by an optical system, which includes:

a mirror being provided to the moving member, the mirror reflecting the energy ray toward the molding face; and an optical guide introducing the energy ray to the mirror from an energy ray source.

\* \* \* \* \*